Oct. 30, 1928.
H. STYRI
1,689,505
CAGE FOR ROLLER BEARINGS
Filed Oct. 8, 1926
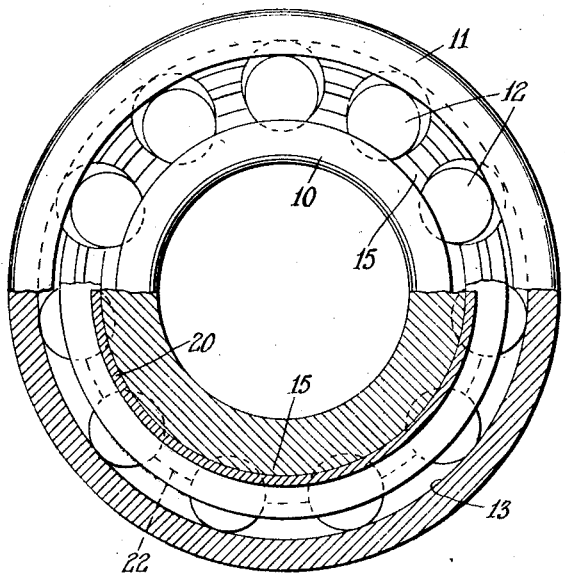
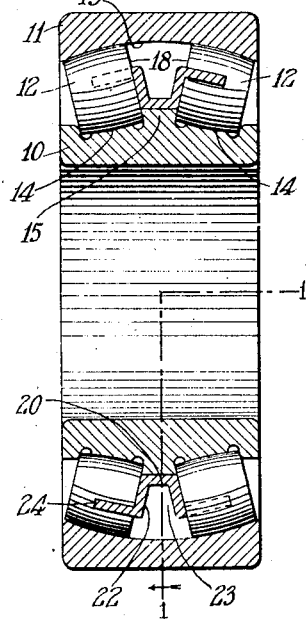
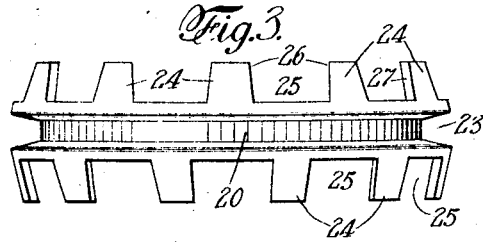
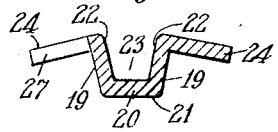
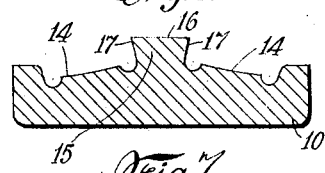
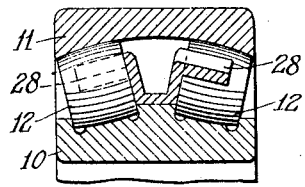
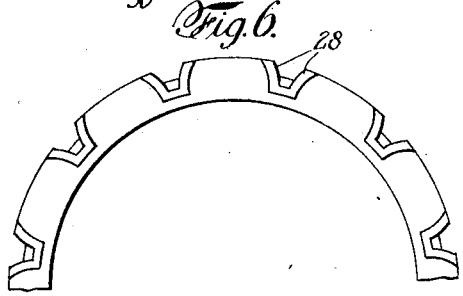
INVENTOR
Haakon Styri
BY
ATTORNEY Patented Oct. 30, 1928.

1,689,505

UNITED STATES PATENT OFFICE.

HAAKON STYRI, OF PHILADELPHIA, PENNSYLVANIA, ASSIGNOR TO THE SKAYEF BALL BEARING COMPANY, OF HARTFORD, CONNECTICUT, A CORPORATION OF CONNECTICUT.

CAGE FOR ROLLER BEARINGS.

Application filed October 8, 1926. Serial No. 140,240.

The cage which is the principal subject matter of this application is particularly adapted to the form of two row self-aligning roller bearing in which the axes of the rollers of the respective rows converge in cones having their axes on the bearing axis at opposite sides of the bearing, the inner race having a guiding flange between the rows formed with spherical bearing surfaces generated from centers respectively located on the bearing axis, the surfaces of the inner ends of the rollers being correspondingly spherical.

In the drawings accompanying this application one practicable embodiment of the invention is illustrated, together with some modified forms, in which drawings Figure 1 is an end view of a roller bearing equipped with my improved cage, shown partly in central section at about the plane of the line 1—1 in Fig. 2.

Fig. 2 is a longitudinal cross section of the bearing illustrated in Figure 1 showing the cage in cross section.

Fig. 3 is a top view of the cage.

Fig. 4 is an enlarged cross sectional detail of the cage.

Fig. 5 is an enlarged cross sectional detail of the inner ring of the bearing.

Fig. 6 shows a partial end elevation of a modified form of the invention.

Fig. 7 is a partial longitudinal section of a bearing equipped with the form of retainer shown in Fig. 6, and Fig. 8 shows another modification in cross section.

The form of bearing illustrated comprises an inner ring, 10, an outer ring, 11, and two rows of longitudinally curved rollers, 12. The outer race ring, 11, is shown formed at its inner surface with a spherical race or track surface, 13, upon which the rollers run. The inner ring, 10, is shown provided with two concave race grooves, 14, between which grooves there is a flange or land, 15, having a substantially cylindrical face, 16. (See Fig. 5.) The side faces, 17, of this flange are spherical, being generated from a center at the center line of the bearing at the point where the prolongation of the axes of the rollers engaging such flange meet the center line.

The formation of the rollers and of the inner race are fully described in the prior art, and no attempt will be made in the drawings to show this formation other than to say that in practice the inner ends, 18, of the rollers abutting the flange, 15, and also abutting the cage presently to be described, are preferably formed with spherical surfaces such as just above mentioned. Figs. 4 and 5 which are drawn to a larger scale do show curved surfaces at, 17—17, and 19—19, which are only approximations of the curves used in bearings of the dimensions of these views.

The cage illustrated comprises an annular sheet metal body, 20, preferably rolled from tubing. While some of the parts of the form of construction are details of the rolling operation, others are essential to the invention. The forming operation is generally performed by means of rolling dies, yet the action of these may, if desired, be supplemented by stamping, pressing and milling.

The annular body, 20, of the cage shown in the illustration, preferably has a cylindrical bore, 21, constructed and adapted to having a running fit on the cylindrical perimeter, 16, of the center land or flange, 15. The structure projects outwardly and with a laterally flaring formation, 22—22, from the body portion, 20. Generally, when this device is made by a rolling operation and from tubing, the members, 22, are in the form of flanges having between them a deep annular recess, 23.

The outer side faces, 19, of these flanges, 22, are shown formed with spherical contours adapted to mate with the spherical ends, 18, of the abutting rollers.

Fingers, 24, are shown projecting laterally from the flanges, 22, for interposition between the rollers. The fingers are shown disposed at substantially right angles to the flanges, or the face, 19, of the flanges, so that the roller engaging edge of each finger occupies a position substantially parallel to the axis of the adjacent roller. A projection of the conical formation upon which the fingers lie is somewhat outside of the conical formation upon which the projection of the axes of the rollers lie.

When the bearing is assembled with its cage and two rows of rollers, the ends, 18, of the rollers abut and are guided by the faces, 17, on the flange, 15, and also abut the face, 19, of the cage, such engagement serving to guide the cage. The cage is preferably so formed that it rides on the face, 16, of the center land, the rollers being separated and guided by the fingers, 24, between which on each side of the cage there is afforded a series of roller pockets, 25.

The sides of adjacent fingers constituting each of the pockets, 25, are substantially parallel. As these fingers are bent inwardly toward the center of the bearing and are disposed outwardly of the pitch circle of the rollers, the corners, 26—26, are disposed outwardly, in an axial direction, of the larger diameter of the roller, so that the roller will snap past them during the operation of assembly and will be securely held in position.

For the purpose of creating a larger surface contact than is afforded by the surface, 27, of the fingers, 24, which in the figures of the drawing heretofore described is representative of the thickness of the sheet metal from which the cage is made, extrusions or flanges, 28, may be struck up or otherwise formed from the roller engaging edges of the fingers, this form of construction being shown in Figures 6 and 7.

Sometimes it will be desirable to roll and form the cage from thicker sheet metal than that shown in the previously described figures, an illustration of thicker material being shown in Fig. 8. In this illustrative example of the invention, it will be seen that the body portion, 30, of the cage presents rather a solid body of metal for riding upon the land and for interposition between the ends of the rollers. The thickness of the metal is such that the side flanges, 32, almost meet, leaving between them, instead of the wide channel, 23, of the other examples, a mere circumferential crevice, 33. The fingers, 34, are quite wide at their roller engaging edges, presenting approximately the same amount of roller engaging surface as is presented in the Figures 6 and 7 construction.

It will be apparent that various changes in detail may be made within the terms of the claims without departing from the spirit of my invention.

Having described my invention I claim and desire to secure by Letters Patent:

1. The combination with a roller bearing having inner and outer race rings and two rows of rollers, the inner ring having an outwardly directed guiding flange between the rows of rollers, of a sheet metal cage comprising a center part constructed and adapted to conform to and ride upon the perimeter of the guiding flange, side flanges carried by such center part and projecting outwardly with a laterally flaring formation and constructed and adapted to conform to and engage the inner or abutting ends of the rollers, and fingers projecting laterally from the rims of the flanges for interposition between the rollers.

2. The combination with a roller bearing having inner and outer race rings and two rows of rollers, the inner ring having an outwardly directed guiding flange between the rows of rollers, of a sheet metal cage comprising a center part constructed and adapted to conform to and ride upon the perimeter of the guiding flange, side flanges carried by such center part constructed and adapted to conform to and engage the inner or abutting ends of the rollers, and fingers projecting laterally from the rims of the flanges for interposition between the rollers, the fingers for each row being disposed at substantially right angles to the flanges carrying them.

3. The combination with a roller bearing comprising an inner and an outer race ring and two rows of rollers, there being an outwardly facing land on the inner ring between the rows of rollers, of a single sheet metal cage for the rows of rollers comprising a center part constructed and adapted to conform to and ride upon the center land of the inner ring, side flanges carried by such center part, each flange being constructed and adapted to conform to and engage the ends of the rollers, and fingers projecting laterally from the rim of each of the flanges for interposition between the rollers, the fingers of each row being disposed at substantially right angles to the flange carrying them and each being disposed substantially parallel with the axis of the adjacent roller.

4. The combination with a roller bearing comprising an inner and an outer race ring and two rows of rollers, the axes of the rollers of the respective rows converging in cones having their axes on the bearing axis, the inner ends of the rollers having spherical bearing surfaces generated from centers located on the bearing axis, the inner race ring having a guiding flange, between the rows, formed with correspondingly generated spherical bearing surfaces, the outer perimeter of the guiding flange being substantially cylindrical, of a sheet metal cage for the rollers comprising a body portion having sides, for engaging the ends of the rollers, generated from the aforesaid centers, the body portion being constructed and adapted to conform to and ride upon the cylindrical perimeter of the guiding flange.

5. A sheet metal cage for a two row roller bearing, comprising a center part constructed and adapted to conform to and ride upon the center land of an inner ring, side flanges carried by such center part constructed and adapted to conform to and engage the inner or abutting end of the intended roller, and fingers projecting laterally from the flanges for interposition between the rollers, the fingers of each row being disposed at substantially right angles to the flange carrying them.

6. A sheet metal cage for a two row roller bearing, comprising a center part constructed and adapted to conform to and ride upon the center land of an inner ring, side flanges carried by such center part, each flange being constructed and adapted to conform to and engage the ends of the intended rollers, and fingers projecting laterally from the rim of each of the flanges for interposition between the rollers, the fingers of each row being disposed at substantially right angles to the flange carrying them and each being disposed substantially parallel with the axis of the adjacent roller.

Signed at New York, New York, this 5th day of October, 1926.

HAAKON STYRI.